US010289602B2

(12) United States Patent
Yoshikawa et al.

(10) Patent No.: US 10,289,602 B2
(45) Date of Patent: May 14, 2019

(54) CALCULATION APPARATUS, DISPLAYING METHOD IN CALCULATION APPARATUS, AND RECORDING MEDIUM

(71) Applicant: CASIO COMPUTER CO., LTD., Shibuya-ku, Tokyo (JP)

(72) Inventors: Hironori Yoshikawa, Sagamihara (JP); Kazuhiko Arikawa, Hamura (JP); Toshibumi Takashima, Kunitachi (JP); Hiroaki Yoshizawa, Ome (JP); Shinichi Tamamoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 16 days.

(21) Appl. No.: 15/804,617

(22) Filed: Nov. 6, 2017

(65) Prior Publication Data

US 2018/0181534 A1  Jun. 28, 2018

(30) Foreign Application Priority Data

Dec. 26, 2016  (JP) ................................. 2016-251247

(51) Int. Cl.
| G06F 15/02 | (2006.01) |
| G06F 7/50 | (2006.01) |
| G06F 7/72 | (2006.01) |
| G06F 3/02 | (2006.01) |
| G06F 3/147 | (2006.01) |

(52) U.S. Cl.
CPC ............ *G06F 15/0225* (2013.01); *G06F 7/50* (2013.01); *G06F 7/72* (2013.01); *G06F 3/02* (2013.01); *G06F 3/147* (2013.01)

(58) Field of Classification Search
CPC ........... G06F 15/0225; G06F 7/50; G06F 7/72
USPC ......................... 708/137, 144–145, 160–170
See application file for complete search history.

(56) References Cited

U.S. PATENT DOCUMENTS

| 3,973,113 A * | 8/1976 | Goldsamt ........... G06F 3/04895 |
| | | 708/137 |
| 5,945,657 A | 8/1999 | Kozai |
| 2013/0275484 A1 | 10/2013 | Osano et al. |

FOREIGN PATENT DOCUMENTS

| JP | 53053225 A | 5/1978 |
| JP | 08202533 A | 8/1996 |
| JP | 10049350 A | 2/1998 |
| WO | 2012086073 A1 | 6/2012 |

* cited by examiner

*Primary Examiner* — Tan V Mai
(74) *Attorney, Agent, or Firm* — Holtz, Holtz & Volek PC (57) ABSTRACT

A calculation apparatus in which a controlling unit performs a first storing process for storing a first value in a storing unit; a first displaying process for executing operation on a second value, using the first value to obtain and display a first and second output value on a displaying unit; a second displaying process for executing operation on a third value, using the first value to obtain and display a third and fourth output value on the displaying unit; a second storing process for adding the third output value to the first output value and the fourth output value to the second output value to obtain and store a first sum and a second sum in the storing unit; and a sum displaying process for displaying the first and second sum stored in the storing unit on the displaying unit in response to operation of the key unit.

15 Claims, 7 Drawing Sheets

OPERATION EXAMPLES (a) 7 | 7.

(b) [÷REMAINDER] [÷REMAINDER] | K [÷REMAINDER] 7.

(c) 200 | K [÷REMAINDER] 200.

(d) [=] | K QUOTIENT REMAINDER [÷REMAINDER] 28- 4

| QUOTIENT SUM | REMAINDER SUM | DIVISOR |
|---|---|---|
| 28 | 4 | 7 |

(e) 300 | K [÷REMAINDER] 300.

| QUOTIENT SUM | REMAINDER SUM | DIVISOR |
|---|---|---|
| 28 | 4 | 7 |

(f) [=] | K QUOTIENT REMAINDER 42- 6

| QUOTIENT SUM | REMAINDER SUM | DIVISOR |
|---|---|---|
| 70 | 10 | 7 |

(g) [QUOTIENT & REMAINDER SUM] | SUM QUOTIENT REMAINDER 71- 3

| QUOTIENT SUM | REMAINDER SUM | DIVISOR |
|---|---|---|
| 71 | 3 | 7 |

(h) [AC] | 0.

| QUOTIENT SUM | REMAINDER SUM | DIVISOR |
|---|---|---|
| 71 | 3 | 7 |

(i) 150 | 150.

| QUOTIENT SUM | REMAINDER SUM | DIVISOR |
|---|---|---|
| 71 | 3 | 7 |

(j) [÷REMAINDER] | [÷REMAINDER] 150.

| QUOTIENT SUM | REMAINDER SUM | DIVISOR |
|---|---|---|
| 71 | 3 | 7 |

(k) 7 | [÷REMAINDER] 7.

| QUOTIENT SUM | REMAINDER SUM | DIVISOR |
|---|---|---|
| 71 | 3 | 7 |

(l) [=] | QUOTIENT REMAINDER 21- 3

| QUOTIENT SUM | REMAINDER SUM | DIVISOR |
|---|---|---|
| 92 | 6 | 7 |

(m) [QUOTIENT & REMAINDER SUM] | SUM QUOTIENT REMAINDER 92- 6

| QUOTIENT SUM | REMAINDER SUM | DIVISOR |
|---|---|---|
| 92 | 6 | 7 |

OPERATION EXAMPLES

| | Input | Display | Quotient Sum | Remainder Sum | Divisor |
|---|---|---|---|---|---|
| (a) | 7 | 7. | | | |
| (b) | ÷ REMAINDER, ÷ REMAINDER | K  ÷REMAINDER  7. | | | |
| (c) | 200 | K  ÷REMAINDER  200. | | | |
| (d) | = | K QUOTIENT REMAINDER ÷REMAINDER  28 - 4 | 28 | 4 | 7 |
| (e) | 300 | K  ÷REMAINDER  300. | 28 | 4 | 7 |
| (f) | = | K QUOTIENT REMAINDER  42 - 6 | 70 | 10 | 7 |
| (g) | QUOTIENT & REMAINDER SUM | SUM QUOTIENT REMAINDER  70 - 10 | 70 | 10 | 7 |
| (h) | AC | 0. | 70 | 10 | 7 |
| (i) | 150 | 150. | 70 | 10 | 7 |
| (j) | ÷ REMAINDER | ÷REMAINDER  150. | 70 | 10 | 7 |
| (k) | 7 | ÷REMAINDER  7. | 70 | 10 | 7 |
| (l) | = | QUOTIENT REMAINDER  21 - 3 | 91 | 13 | 7 |
| (m) | QUOTIENT & REMAINDER SUM | SUM QUOTIENT REMAINDER  91 - 13 | 91 | 13 | 7 |

CALCULATION APPARATUS, DISPLAYING METHOD IN CALCULATION APPARATUS, AND RECORDING MEDIUM

CROSS-REFERENCE TO RELATED APPLICATION

The present application is based upon and claims the benefit of priority from the prior Japanese Patent Application No. 2016-251247, filed Dec. 26, 2016, the entire contents of which are incorporated herein by reference.

BACKGROUND OF THE INVENTION

1. Technical Field of the Invention

The present invention relates to a calculation apparatus, a displaying method in the calculation apparatus, and a recording medium.

2. Description of the Related Art

A calculation apparatus is disclosed in Japanese Unexamined Patent Publication No. Sho53-53225 (Patent document), in which apparatus an operand to be used as a divisor and another operand to be used as a dividend are entered through an input unit, and an operation is executed to divide the dividend by the divisor, and the first result and the second result obtained in the operation are indicated to a user. More specifically, using the calculation apparatus disclosed by the Patent document, it is possible to perform division to obtain a quotient with remainder in addition to an operation of average division and to indicate the calculation result: "quotient" (first result) and "remainder" (second result) to the user.

When the user of the calculation apparatus of this type performs calculations (for example, divisions) several times using specific operands and obtains the sum of first results (for example, the quotients) and the sum of second results (for example, the remainders), sometimes he or she meets with a case where he or she has to know the sum of first results and the sum of second results. But a calculation apparatus having a function of indicating the sum of first results and the sum of second results is not available.

Supposing a situation where some commodities are stored in a storehouse with each seven units of them packed in one box, and upon receipt of an order form a customer, a salesclerk collects the commodities at the storehouse. In this situation, when the salesclerk receives an order of 200 units from a customer and another order of 300 units from a separate customer, the salesclerk has a calculation problem, that is, the salesclerk is required to calculate how many boxes and how many units of commodities he or she should collect at the storehouse.

In this case, using the average calculation apparatus, the salesclerk presses the input keys to enter "2", "0", "0", "÷", "7" and "=", and then the calculation apparatus indicates a first result (quotient) "28" in the first calculation on a displaying unit. When the salesclerk presses the key of "remainder", a second result "4" (remainder) in the first calculation is indicated on the displaying unit. The salesclerk takes notes of the first quotient "28" and the first remainder "4". And then, the salesclerk again presses the input keys to enter "3", "0", "0", "÷", "7" and "=", and then the calculation apparatus indicates a second result (quotient) "42" in the second calculation on the displaying unit. When the salesclerk presses the key of "remainder", a second result (remainder) "6" in the second calculation is indicated on the displaying unit. The salesclerk takes notes of the second quotient "42" and the second remainder "6".

Thereafter, the salesclerk calculates the number of boxes and the number of commodities which he or she should collect at the storehouse. The sum of the first quotient and the second quotient is calculated. In other words, the input keys are pressed to enter "2", "8", "+", "4", "2", "=". Then the number of boxes "70" is obtained. Similarly, the input keys are pressed to enter "4", "+", "6", "=". Then the number of commodities "10" is obtained. When calculations are performed several times using the specific operand (in this case, "7") in this manner, and the salesclerk wants to know the sum of the obtained first results (for example, quotients) and the sum of the obtained second results (for example, remainders), he or she is required to take notes of the first calculation results and further he or she is required to enter the first calculation results and the second calculation results again to obtain the sum of the first calculation results and the second calculation results. As described above, the salesclerk is required to do troublesome operation.

As described above, even if the same operand (divisor) is used, this divisor has to be repeatedly entered every time the calculation is performed. The salesclerk is required to do troublesome operation before he or she obtains the desired result finally.

SUMMARY OF THE INVENTION

According to one aspect of the invention, there is provided a calculation apparatus having a controlling unit, wherein the controlling unit performs processes comprising a first storing process for storing a first input value in a storing unit; a first displaying process for executing an operation on a second input value, using the first input value stored in the storing unit to obtain a first output value and a second output value, and for displaying the first output value and the second output value on a displaying unit; a second displaying process for executing the operation on a third input value, using the first input value stored in the storing unit to obtain a third output value and a fourth output value, and for displaying the third output value and the fourth output value on the displaying unit; a second storing process for adding the third output value displayed on the displaying unit to the first output value to obtain a first sum, and adding the fourth output value displayed on the displaying unit to the second output value to obtain a second sum, and for storing the first sum and the second sum in the storing unit; and a sum displaying process for reading and displaying at least one of the first sum and the second sum stored in the storing unit on the displaying unit in response to operation of a first key of a key input unit.

According to another aspect of the invention, there is provided a displaying method performed by a computer in a calculation apparatus, wherein the calculation apparatus has a storing unit, a key input unit, and a displaying unit, the method comprising: a first storing process for storing a first input value in the storing unit; a first displaying process for executing an operation on a second input value, using the first input value stored in the storing unit to obtain a first output value and a second output value, and for displaying the first output value and the second output value on the displaying unit; a second displaying process for executing the operation on a third input value, using the first input value stored in the storing unit to obtain a third output value and a fourth output value, and for displaying the third output value and the fourth output value on the displaying unit; a second storing process for adding the third output value displayed on the displaying unit to the first output value to obtain a first sum, and adding the fourth output value displayed on the displaying unit to the second output value to obtain a second sum, and for storing the first sum and the second sum in the storing unit; and a sum displaying process for reading and displaying at least one of the first sum and the second sum stored in the storing unit on the displaying unit in response to operation of a first key of the key input unit.

According to still another aspect of the invention, there is provided a non-transitory recording medium with a program executable by a controlling unit, stored thereon, wherein the controlling unit is mounted on a calculation apparatus having a storing unit, a key input unit, and a displaying unit, and the program instructs the controlling unit to perform processes comprising: a first storing process for storing a first input value in the storing unit; a first displaying process for executing an operation on a second input value, using the first input value stored in the storing unit to obtain a first output value and a second output value, and for displaying the first output value and the second output value on the displaying unit; a second displaying process for executing the operation on a third input value, using the first input value stored in the storing unit to obtain a third output value and a fourth output value, and for displaying the third output value and the fourth output value on the displaying unit; a second storing process for adding the third output value displayed on the displaying unit to the first output value to obtain a first sum, and adding the fourth output value displayed on the displaying unit to the second output value to obtain a second sum, and for storing the first sum and the second sum in the storing unit; and a sum displaying process for reading and displaying at least one of the first sum and the second sum stored in the storing unit on the displaying unit in response to operation of a first key of the key input unit.

BRIEF DESCRIPTION OF THE DRAWINGS

The accompanying drawings illustrate embodiments of the invention, and together with the detailed description of the embodiments given below, serve to explain the principles of the invention for better understanding of the invention.

DETAILED DESCRIPTION OF THE PREFERRED EMBODIMENTS

The embodiments of the present invention will be described with reference to the accompanying drawings in detail. In the accompanying drawings and the whole description of the embodiments of the invention, like reference numerals are used to indicate like elements.

[Whole Configuration of Calculation Apparatus]

Figure 1:
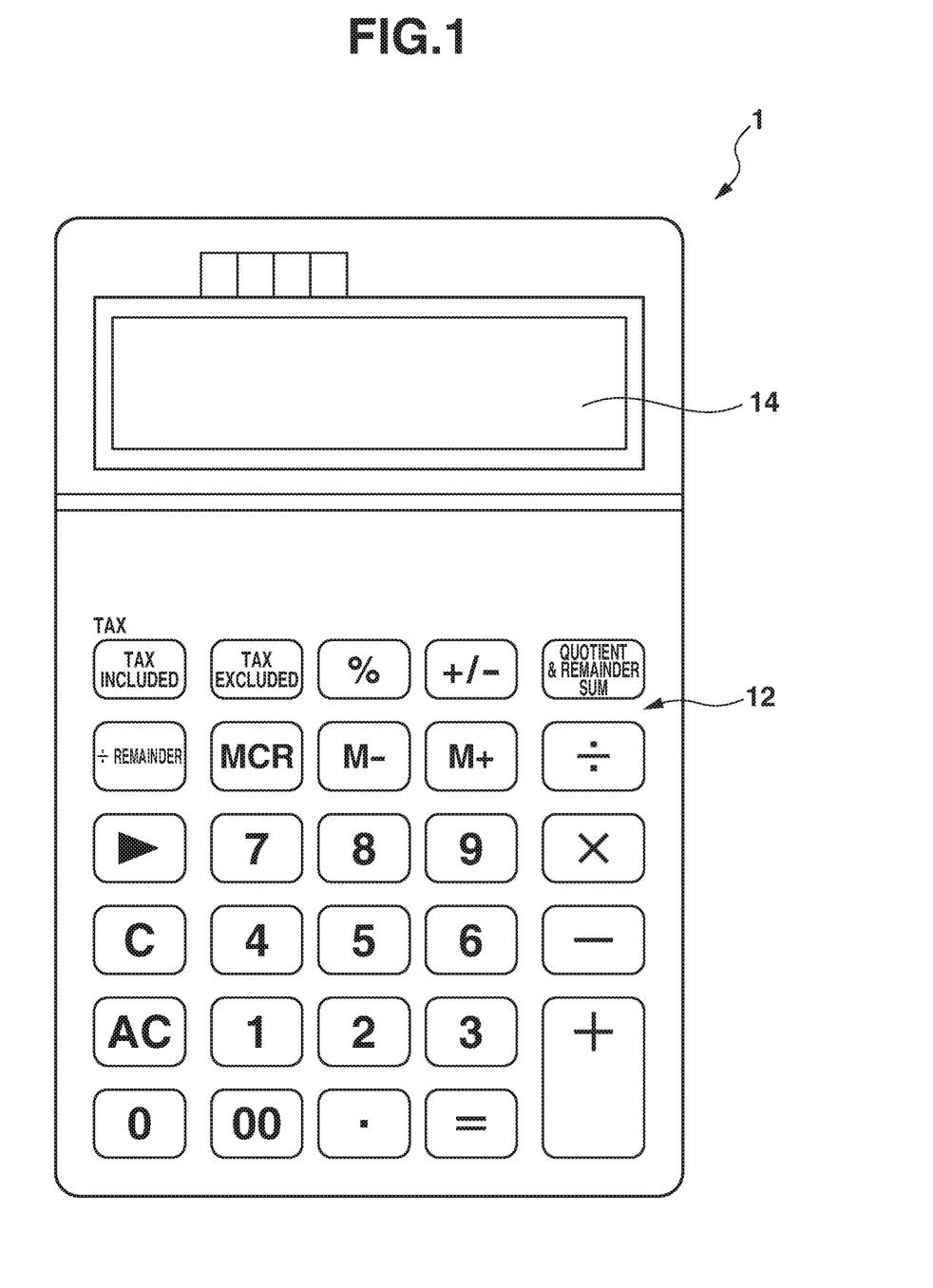
FIG. 1 is a plan view showing a calculation apparatus according to the embodiment of the invention.

FIG. 1 is a plan view showing a calculation apparatus 1 according to the embodiment of the invention.

Figure 2:
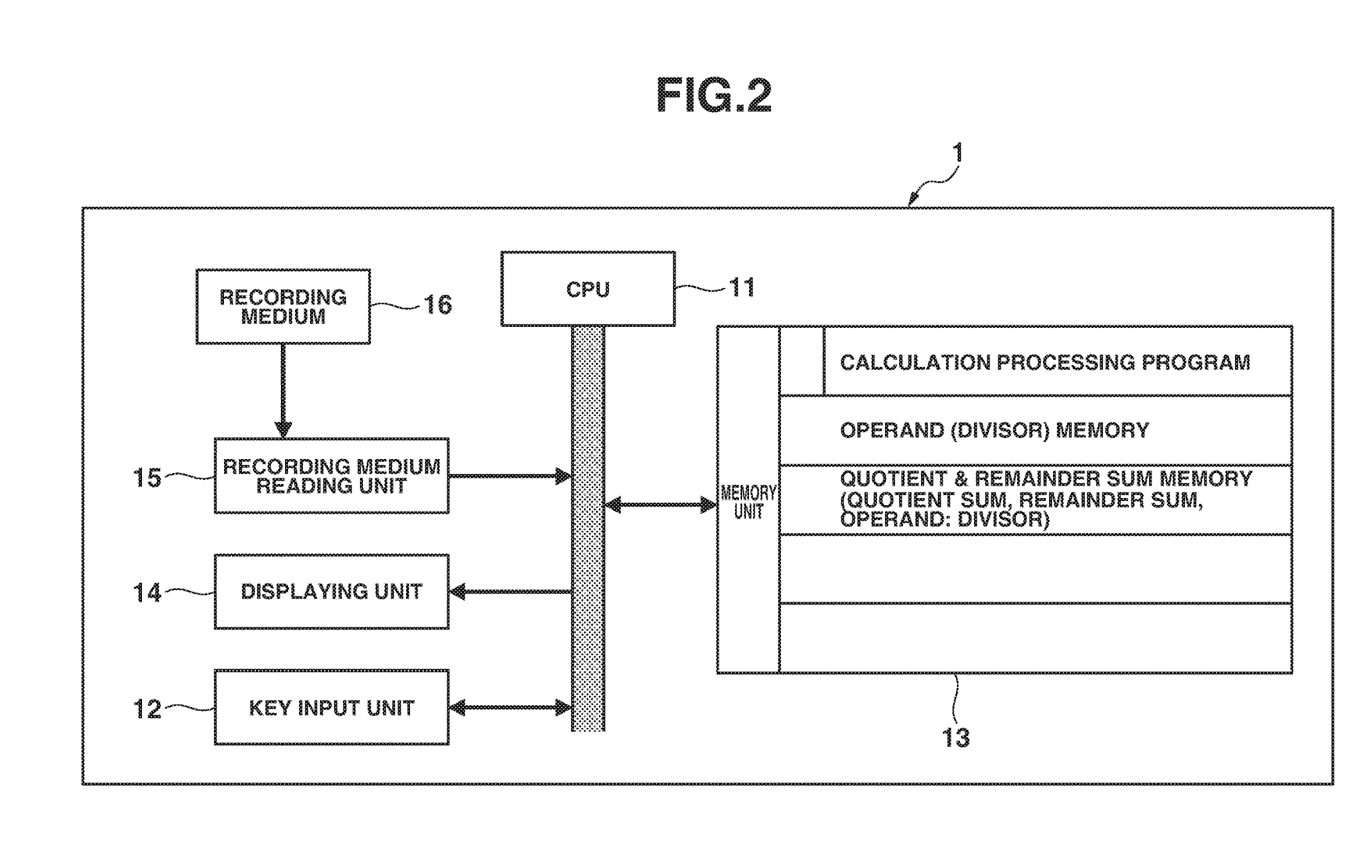
FIG. 2 is a block diagram showing a configuration of the calculation apparatus according to the embodiment of the invention.

FIG. 2 is a block diagram showing a configuration of the calculation apparatus 1 according to the embodiment of the invention.

As shown in FIG. 1 and FIG. 2, CPU 11 controls the whole operation of the calculation apparatus 1.

The CPU 11 is connected with a key input unit (input unit) 12, a memory unit 13, a displaying unit 14 and a recording-medium reading unit 15.

The key input unit 12 is provided with ten keys for numerical calculation: "0" to "9", operator keys: "+", "−", "x" and "÷", a quotient with remainder calculation key: "÷ remainder" or "÷ remainder" key (operation instructing key), a quotient & remainder summing key: "quotient & remainder sum" or "quotient & remainder sum" key, a clear key: "C" or "C" key, an all clear key: "AC" or "AC" key, and a calculation key: "=" or "=" key.

The quotient with remainder calculation key ("÷ remainder" key) is operated in place of a generally used operator key ("÷" key) to perform a division to obtain a quotient and a remainder. In other words, the "÷ remainder" key is operated to perform an operation (hereinafter, a calculation of a quotient with remainder) for calculating a quotient (first result) by dividing a dividend by a divisor and obtaining a left remainder (second result).

The function of the quotient & remainder sum key ("quotient & remainder sum" key) will be described later.

The memory unit 13 is composed of ROM and RAM.

The ROM of the memory unit 13 stores a program for performing a calculating process, which instructs the CPU 11 to function as a controlling unit. The processes which will be described hereinafter are executed by the CPU 11 which serves as the controlling unit. Hereinafter, the CPU 11 serving as the controlling unit will be simply referred to as the CPU 11.

The RAM of the memory unit 13 stores numerical data entered from the key input unit 12 and also numerical data obtained in the performed operation, as needed.

For instance in the present embodiment of the invention, in the RAM are secured an area for an operand memory, in which divisors in calculations of a quotient with remainder are stored, and an area for a quotient & remainder sum memory, in which a quotient sum (first result sum), a remainder sum (second result sum), and operands (divisors) are stored.

The displaying unit 14 displays operation numerical data, operation symbols, a constant-locked symbol, and calculation-result explanation character strings, in response to a key input operation performed on the key input unit 12.

As will be described with reference to FIG. 4 and FIG. 7 later, when the quotient with remainder calculation key ("÷ remainder" key) is operated, the operation symbol "÷ remainder" of a quotient with remainder calculation is indicated, and when the quotient with remainder calculation key, "÷ remainder" is further operated, a constant-locked symbol, "K" is indicated together with the operation symbol "÷ remainder" of the quotient with remainder calculation.

When the result of the quotient with remainder calculation is indicated, "a quotient" and "a remainder" are indicated as the calculation-result explanation character string. When the quotient & remainder sum is indicated, "a sum", "a quotient" and "a remainder" are displayed as the calculation-result explanation character string.

The recording-medium reading unit 15 serves to read data and a program from the recording medium such as a detachable flash memory.

First Embodiment of the Invention

Figure 3:
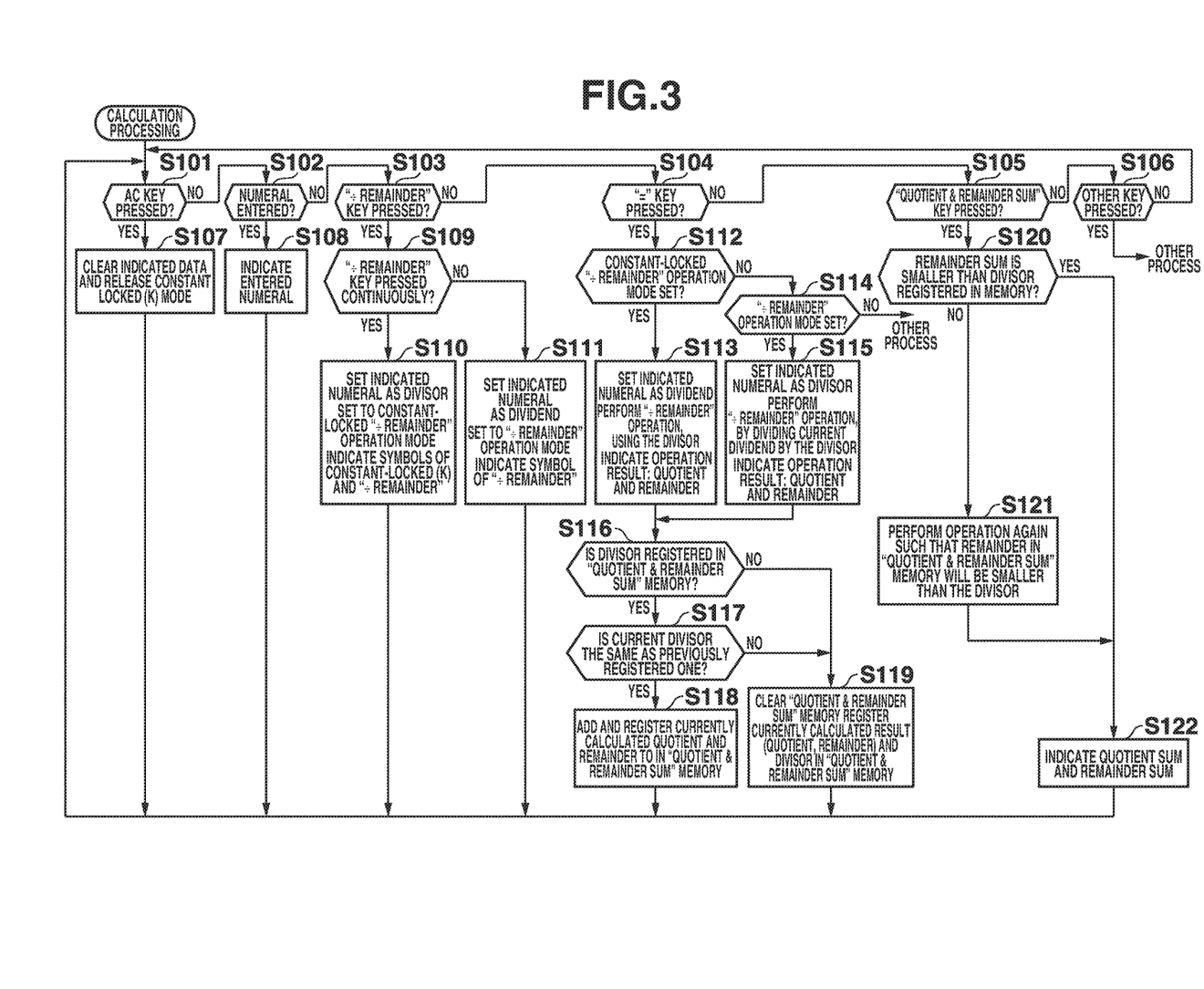
FIG. 3 is a flow chart showing the controlling procedure executed in the calculation apparatus according to the first embodiment of the invention.

A controlling procedure of the calculation apparatus 1 according to the first embodiment of the invention is shown in FIG. 3 and will be described with reference to operation of the calculation apparatus 1 shown in FIG. 4. In the following description, the quotient with remainder calculation will be referred to as the "÷ remainder" calculation.

FIG. 3 is a flow chart showing the controlling procedure executed in the calculation apparatus 1 according to the first embodiment of the invention.

Figure 4:
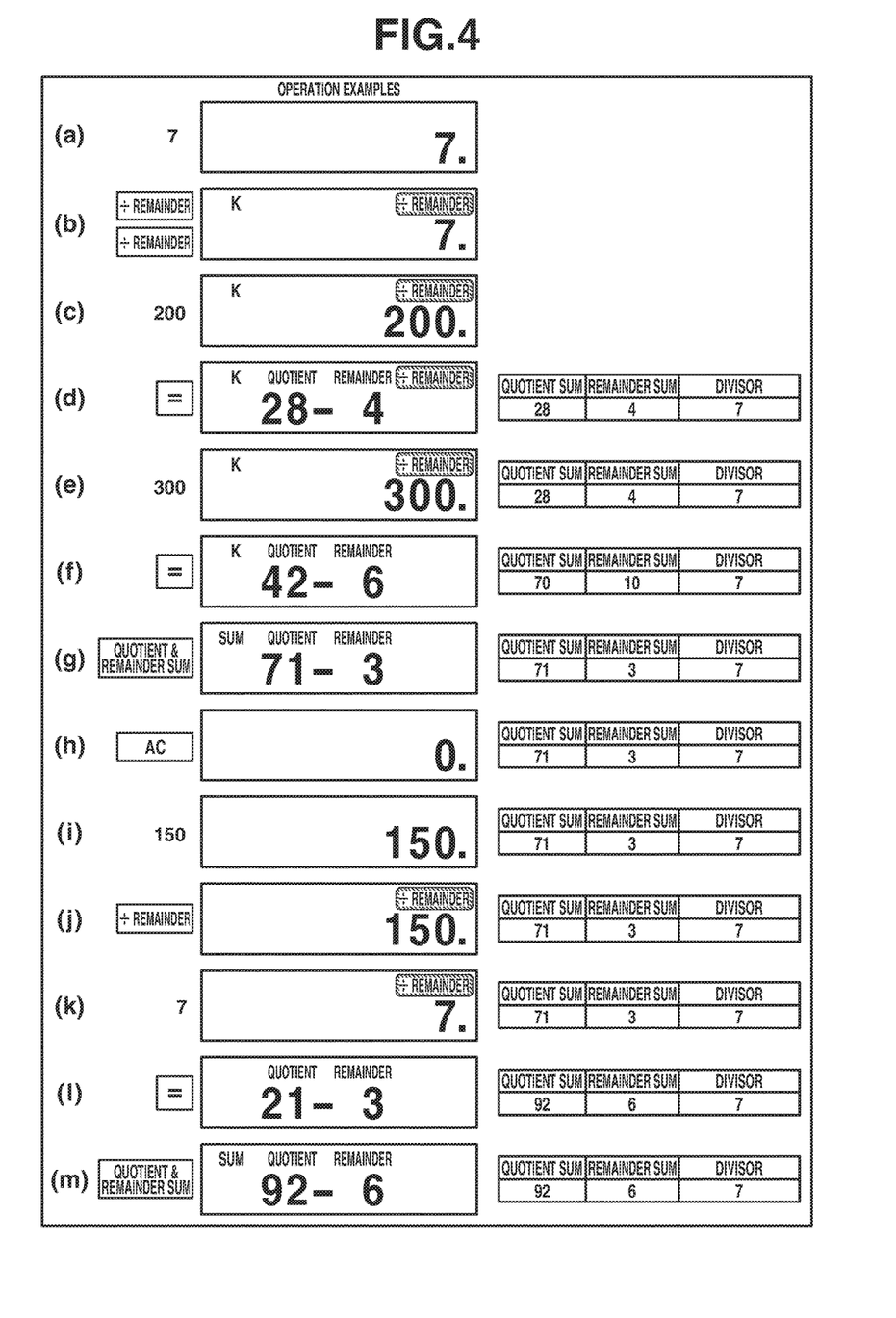
FIG. 4 is a view for explaining examples (a)-(m) of operation performed by the calculation apparatus according to the first embodiment of the invention.

FIG. 4 is a view for explaining examples (a)-(m) of operation performed by the calculation apparatus 1 according to the first embodiment of the invention.

FIG. 4 (*a*)-(*m*) shows an image transition indicated on the displaying unit 14 and a transition of numerals stored in the quotient & remainder sum memory area, indicated on the display screen of the displaying unit 14 in response to operation of the key input unit 12. The operated keys are indicated on the left side of the display screen and data stored in the quotient & remainder sum memory area is indicated on the right side of the display screen.

When the power is turned on, the calculation apparatus 1 keeps watching which operation is performed, in other words, keeps watching which process at step S101, S102, S103, S104, S105 or S106 has been operated, as shown in FIG. 3.

When a numeral "7" is entered, the CPU 11 judges whether a numeral has been entered (step S102 in FIG. 3) and determines that a numeral has been entered (YES at step S102). Then, the CPU 11 instructs the displaying unit 14 to display the numeral "7" as shown at (a) in FIG. 4 (step S108).

Further, when the quotient with remainder calculation key, that is, the "÷ remainder" key is pressed, the CPU 11 judges whether the "÷ remainder" key has been operated (step S103) and determines that the "÷ remainder" key has been operated (YES at step S103). Then, the CPU 11 judges whether the "÷ remainder" key has been pressed continuously (step S109). Since the "÷ remainder" key has been pressed for the first time, the CPU 11 determines NO at step S109.

The CPU 11 sets the indicated numeral "7" as an operand (dividend) for the moment and displays the operation symbol of "÷ remainder" at the top of the indicated numeral "7", as shown at (b) in FIG. 4 (step S111).

When the "÷ remainder" key is pressed once more, the CPU 11 judges whether the "÷ remainder" key has been pressed continuously (step S109). Since the "÷ remainder" key has been continuously pressed for the second time, the CPU 11 determines YES at step S109. Then the CPU 11 sets the indicated numeral "7" as an operand (divisor) and brings the calculation apparatus 1 in a constant-locked "÷ remainder" operation mode and displays the constant-locked symbol "K" at the upper-left corner of the display screen of the displaying unit 14 as shown at (b) in FIG. 4 (step S110).

When the indicated numeral "7" is set as the operand (divisor) at step S110, the numeral "7" is stored in the operand (divisor) memory of the memory unit 13 shown in FIG. 2.

When a dividend "200" is entered, in other words, when numerals "2", "0" and "0" are entered successively, the CPU 11 judges three times, whether a numeral has been entered (step S102) and determines YES at step S102 three times. The CPU 11 repeatedly performs the process of step S108 three times, and the numeral "200" is indicated on the displaying unit 14 as shown at (c) in FIG. 4.

Further, when the calculation key "=" ("=" key) is pressed, the CPU 11 judges whether the calculation key "=" ("=" key) has been pressed (step S104), and determines YES at step S104. Then the CPU 11 judges whether the calculation apparatus 1 has been set to the constant-locked "÷ remainder" operation mode (step S112). When it is determined YES at step S112, the CPU 11 sets the indicated numeral "200" as a dividend and executes a"÷ remainder" operation by dividing the dividend "200" by the operand (divisor) "7". Then the CPU 11 displays the operation result "28-4" on the displaying unit 14 and indicates the operation result explaining character strings, "quotient" and "remainder" at corresponding positions on the top side of the operation result "28-4", as shown at (d) in FIG. 4 (step S113).

After displaying the operation result of the constant-locked "÷ remainder" operation on the displaying unit 14 (step S113), the CPU 11 judges whether the operand (divisor) has been registered in the quotient & remainder sum memory area (step S116). Since the current operation is the first one, the CPU 11 determines NO at step S116, and clears the quotient & remainder sum memory and registers the current operand (divisor) "7" and the operation result (quotient "28" and remainder "4") in the quotient & remainder sum memory, as shown on the right side of (d) in FIG. 4 (step S119).

Meanwhile, when a dividend "300" is entered, in other words, when numerals "3", "0" and "0" are entered successively, the CPU 11 judges three times, whether a numeral has been entered (step S102) and determines YES at step S102 three times. The CPU 11 repeatedly performs the process of step S108 three times, and the numeral "300" is indicated on the displaying unit 14 as shown at (e) in FIG. 4.

Further, when the "=" key is pressed, the CPU 11 judges whether the "=" key has been pressed (step S104). When it is determined YES at step S104, the CPU 11 judges whether the calculation apparatus 1 has been set to the constant-locked "÷ remainder" operation mode (step S112). When it is determined YES at step S112, the CPU 11 sets the indicated numeral "300" as a dividend and executes the "÷ remainder" operation by dividing the dividend "300" by the operand "7". Then the CPU 11 displays the operation result "42-6" on the displaying unit 14 and indicates the operation result explaining character strings: "quotient" and "remainder", at the corresponding positions on the top side of the operation result "42-6", as shown at (f) in FIG. 4 (step S113).

After displaying the operation result of the constant-locked "÷ remainder" operation on the displaying unit 14 (step S113), the CPU 11 judges whether the operand (divisor) has been registered in the quotient & remainder sum memory area (step S116). Since the current operation is the second one, the CPU 11 determines YES at step S116. The CPU 11 judges whether the current operand (divisor) is the same as the previously registered operand (divisor) (step S117) and determines YES at step S117. Then the CPU 11 adds the quotient and remainder obtained in the current operation to the previously registered quotient and remainder, respectively and registers the sums (quotient sum "70" and remainder sum "10") in the quotient & remainder sum memory, as shown on the right side of (f) in FIG. 4 (step S118).

When the "quotient & remainder sum" key is pressed, the CPU 11 judges whether the "quotient & remainder sum" key has been pressed (step S105) and determines YES at step S105. Further the CPU 11 judges whether the remainder sum is smaller than the operand (divisor) registered in the quotient & remainder sum memory (step S120).

In the above example, a remainder sum registered in the quotient & remainder sum memory is "10" and is larger than the operand (divisor) "7" registered in the quotient & remainder sum memory, and therefore the CPU 11 determines NO at step S120. The CPU 11 executes a calculation by dividing the remainder sum by the operand (divisor) again and updates data registered in the quotient & remainder sum memory, such that the remainder sum (second result sum) registered in the quotient & remainder sum memory will be smaller than the operand (divisor) (step S121).

More specifically, a process is performed at step S121, in which the remainder sum "10" is divided by the operand (divisor) "7", and the obtained remainder "3" is used as the remainder sum and the quotient "1" is carried up to the quotient sum, and these remainder sum and quotient sum are registered in the quotient & remainder sum memory.

Thereafter, the CPU 11 displays the quotient sum with remainder "71-3" on the displaying unit 14, and indicates the operation result explaining character strings: "quotient" and "remainder" respectively at the corresponding positions on the top side of the quotient sum with remainder "71-3" and further indicates the operation result explaining character string "sum" on the right side of the indicated "quotient" and "remainder", as shown at (g) in FIG. 4 (step S113).

Next, when the "AC" key is pressed, the CPU 11 determines that the "AC" key has been pressed (YES at step S101), and clears data indicated on the displaying unit 14, releasing the constant-locked mode, as shown at (h) in FIG. 4 (step S107). However, when the "AC" key is pressed, the locked constant is released, and the operand (divisor) "7" stored in the operand (divisor) memory of the memory is reset, but data stored in the quotient & remainder sum memory is not cleared.

When a dividend "150" is entered, in other words, when numerals "1", "5" and "0" are entered successively, the CPU 11 judges three times, whether a numeral has been entered (step S102) and determines YES at step S102 three times. Then, since the CPU 11 repeatedly executes the process of step S108 three times, the numeral "150" is indicated on the displaying unit 14, as shown at (i) in FIG. 4.

When the "÷ remainder" key is pressed, the CPU 11 judges whether the "÷ remainder" key has been operated (step S103) and determines that the "÷ remainder" key has been operated (YES step S103). Further, the CPU 11 judges whether the "÷ remainder" key has been operated (step S103) and determines that the "÷ remainder" key has not been operated continuously (step S103), and determines NO at step S109, since the "AC" key was pressed previously. The CPU 11 sets the indicated numeral "150" as a dividend, and indicates the operation symbol "÷ remainder" at the top of the numeral "150" indicated on the displaying unit 14 (step S111), as shown at (i) in FIG. 4.

Next, when a numeral "7" is entered, the CPU 11 judges whether a numeral has been entered (step S102) and determines YES at step S102. Then, the CPU 11 instructs the displaying unit 14 to display the numeral "7" as shown at (k) in FIG. 4 (step S108).

Further, when the "=" key (the calculation key: "=" key) is pressed, the CPU 11 judges whether the "=" key has been pressed (step S104). Determining YES at step S104, the CPU 11 judges whether the calculation apparatus 1 has been set to the constant-locked "÷ remainder" operation mode (step S112). Since the "AC" key has been pressed and the constant-locked mode is released, the CPU 11 determines that the calculation apparatus 1 has not been set to the constant-locked "÷ remainder" operation mode (NO at step S112).

The CPU 11 judges whether the calculation apparatus 1 has been set to the "÷ remainder" operation mode (step S114). The CPU 11 determines YES at step S114, and sets the indicated numeral "7" to an operand (divisor), executing the "÷ remainder" calculation by dividing the numeral "150" directly and previously set to the dividend by the operand (divisor) "7". Then the CPU 11 displays the operation result "21-3" on the displaying unit 14 and indicates the operation result explaining character strings: "quotient" and "remainder", at corresponding positions on the top side of the operation result "21-3", as shown at (l) in FIG. 4 (step S115).

Further, the CPU 11 judges whether the operand (divisor) has been registered in the quotient & remainder sum memory (step S116) after displaying the operation result of the "÷ remainder" calculation (step S115). Since the data stored in the quotient & remainder sum memory is not cleared only by operation of pressing the "AC" key, the CPU 11 determines YES at step S116.

The CPU 11 judges whether the current operand (divisor) is the same as the operand (divisor) registered in the operand memory (step S117). Since the operand (divisor) "7" is used this time, the CPU 11 determines YES at step S117, and the quotient and remainder, "21-3", calculated in the current operation are added to the previously registered quotient and remainder, "71-3", respectively, and the resultant numerals, "92-6" are registered in the quotient & remainder sum memory, as shown on the right side at (l) in FIG. 4 (step S118).

When the "quotient & remainder sum" key is pressed, the CPU 11 judges whether the "quotient & remainder sum" key has been pressed (step S105), and determines YES at step S105. Further the CPU 11 judges whether the remainder sum is smaller than the operand (divisor) registered in the quotient & remainder sum memory (step S120).

In the above example, the remainder sum registered in the quotient & remainder sum memory is "6" and is smaller than the operand (divisor) "7" registered in the quotient & remainder sum memory, as shown on the right side of (l) in FIG. 4, and therefore the CPU 11 determines YES at step S120.

The CPU 11 displays the quotient sum with remainder "92-6" on the displaying unit 14 and indicates the operation result explaining character strings: "quotient" and "remainder", at corresponding positions on the top side of the operation result "92-6", as shown at (m) in FIG. 4 (step S122).

In the above example, the "AC" key is pressed and then the operand (divisor) "7" is entered, as shown at (k) in FIG. 4, but when an operand (divisor) other than "7" is entered, the CPU 11 determines NO at step S117. Therefore, the "AC" key is pressed and the quotient & remainder sum memory is cleared and then a new operation result (quotient and remainder) is registered in the quotient & remainder sum memory (step S119).

As described above, the controlling procedure will allow to easily indicate the quotient sum and the remainder sum obtained when plural dividends are divided by a specified operand (divisor).

More specifically, as described with reference to the flow chart of FIG. 3, when the "÷ remainder" key is pressed continuously after an operand (divisor) is entered, the calculation apparatus 1 is set to the constant-locked operation mode, in which the operand (divisor) is fixed. Then, the "÷ remainder" calculation is executed, in which the dividends entered thereafter are divided by the fixed operand (divisor), and plural calculated quotients are added to obtain a quotient sum and the plural left remainders are added to obtain a remainder sum. And these quotient sum and remainder sum are indicated. Therefore, it is possible to indicate in a simple manner the quotient sum and the remainder sum obtained when plural dividends are divided by the specified operand (divisor).

In the first embodiment of the invention, when the remainder sum is larger than the operand (divisor), an operation is executed again such that the remainder sum will be smaller than the operand (divisor) (a carrying-up process), and the operation result is indicated. Therefore, the user is not required to execute a calculation again.

But even thought the remainder sum is larger than the operand (divisor), sometimes the user will want to confirm the quotient and the remainder which are obtained in the carrying-up process executed, after confirming the quotient and the remainder obtained before the carrying-up process is executed. In this case, the controlling procedure will be performed in accordance with a flow chart of FIG. 5 in place of the flow chart of FIG. 3.

Figure 5:
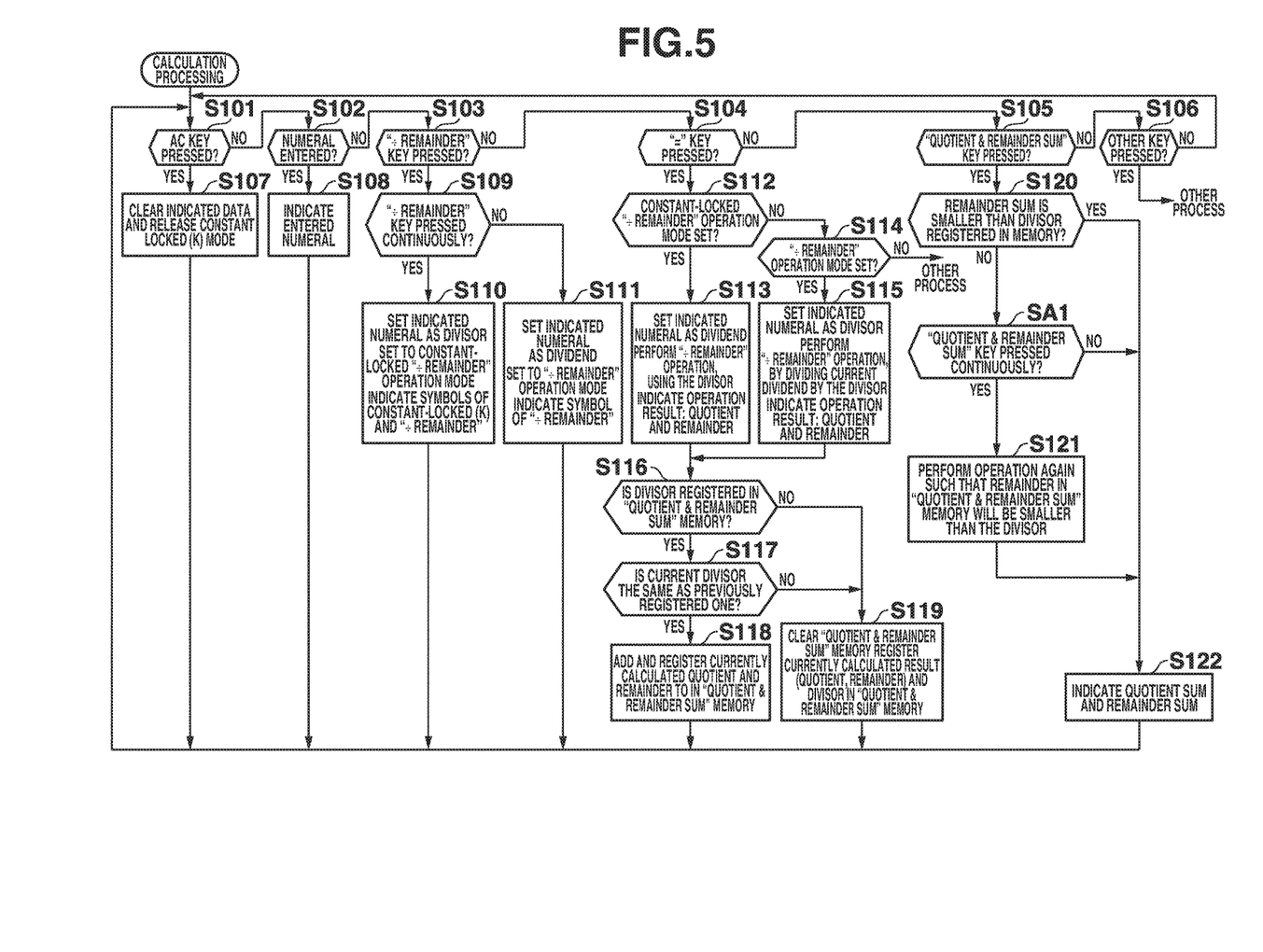
FIG. 5 is a flow chart showing a modified controlling procedure executed in the calculation apparatus according to the first embodiment of the invention.

FIG. 5 is the flowchart for explaining the modified embodiment to the first embodiment, in which the quotient and the remainder which are obtained in the carrying-up process executed can be confirmed, after confirming the quotient and the remainder obtained before the carrying-up process is executed.

The flow chart of FIG. 5 is different from FIG. 3 in that a process of step SA1 is added between the step S120 and the step S121.

In the flow chart of FIG. 5 with step SA1 added between step S120 and step S121 (in the flow chart of FIG. 5), when the "quotient & remainder sum" key is pressed for the first time at step S105, the CPU 11 advances to step S120. Further the CPU 11 advances to step S122 when it is determined YES at step S120 or when it is determined NO at step SA1. Therefore, the quotient sum with remainder is indicated on the displaying unit 14 at step S122 with no carrying-up process executed at step S121.

Meanwhile, when the "quotient & remainder sum" key is pressed once again, the CPU 11 judges whether he "quotient & remainder sum" key has been pressed continuously (step SA1). When it is determined YES at step SA1 and the carrying-up process can be performed, then the CPU 11 advances to step S121 and further to step S122 and therefore the quotient sum with remainder calculated in the carrying-up process is indicated on the displaying unit 14 (step S122).

Further in the first embodiment, in another calculation after the "AC" key is pressed to reset the operand (divisor), as far as the "÷ remainder" calculation is executed using the same operand (divisor) as one used in the previous operation, the calculation result is added to the quotient sum and the remainder sum registered in the quotient & remainder sum memory, and the quotient sum and the remainder sum can be indicated on the displaying unit 14 in response to operation of the quotient with remainder calculation key.

Further in the first embodiment, in the another calculation after the "AC" key is pressed to reset the operand (divisor), as far as the "÷ remainder" calculation is executed using the same operand (divisor) as one used in the previous operation, the calculation result is added to the quotient sum and the remainder sum registered in the quotient & remainder sum memory, and when another operand (divisor) is entered, the quotient & remainder sum memory is cleared. But it is possible to clear the quotient & remainder sum memory by operation of the "AC" key.

Second Embodiment of the Invention

Figure 6:
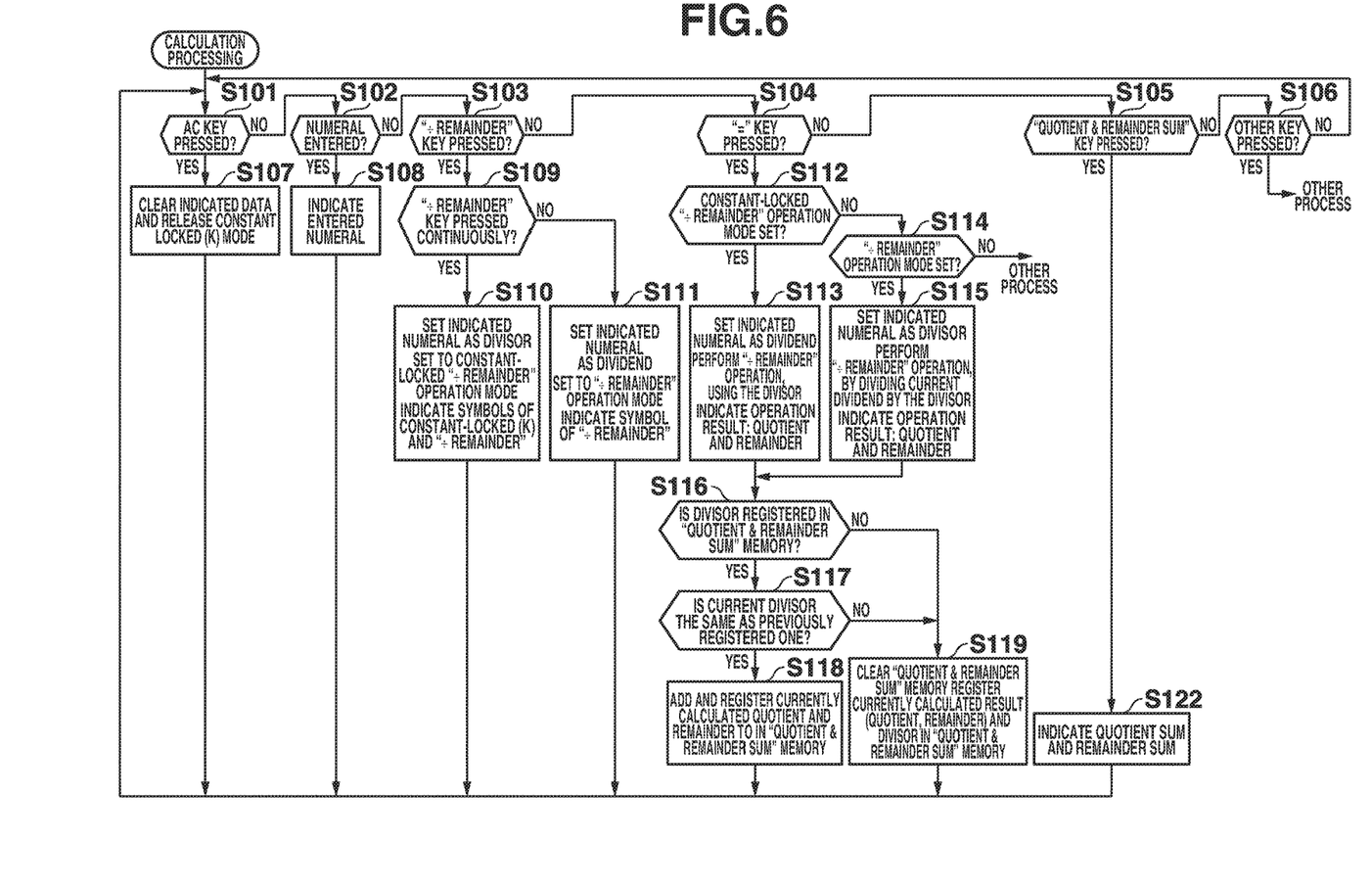
FIG. 6 is a flow chart showing the controlling procedure executed in the calculation apparatus according to the second embodiment of the invention.

The controlling procedure of the calculation apparatus 1 according to the second embodiment of the invention is shown in FIG. 6 and will be described with reference to operation of the calculation apparatus 1 shown in FIG. 7.

Since the second embodiment contains many elements which are substantially the same as those described in the first embodiment, only the elements different from the first embodiment will be described and sometimes the description of the like elements will be omitted in the following description.

FIG. 6 is a flow chart showing the controlling procedure executed in the calculation apparatus 1 according to the second embodiment of the invention.

Figure 7:
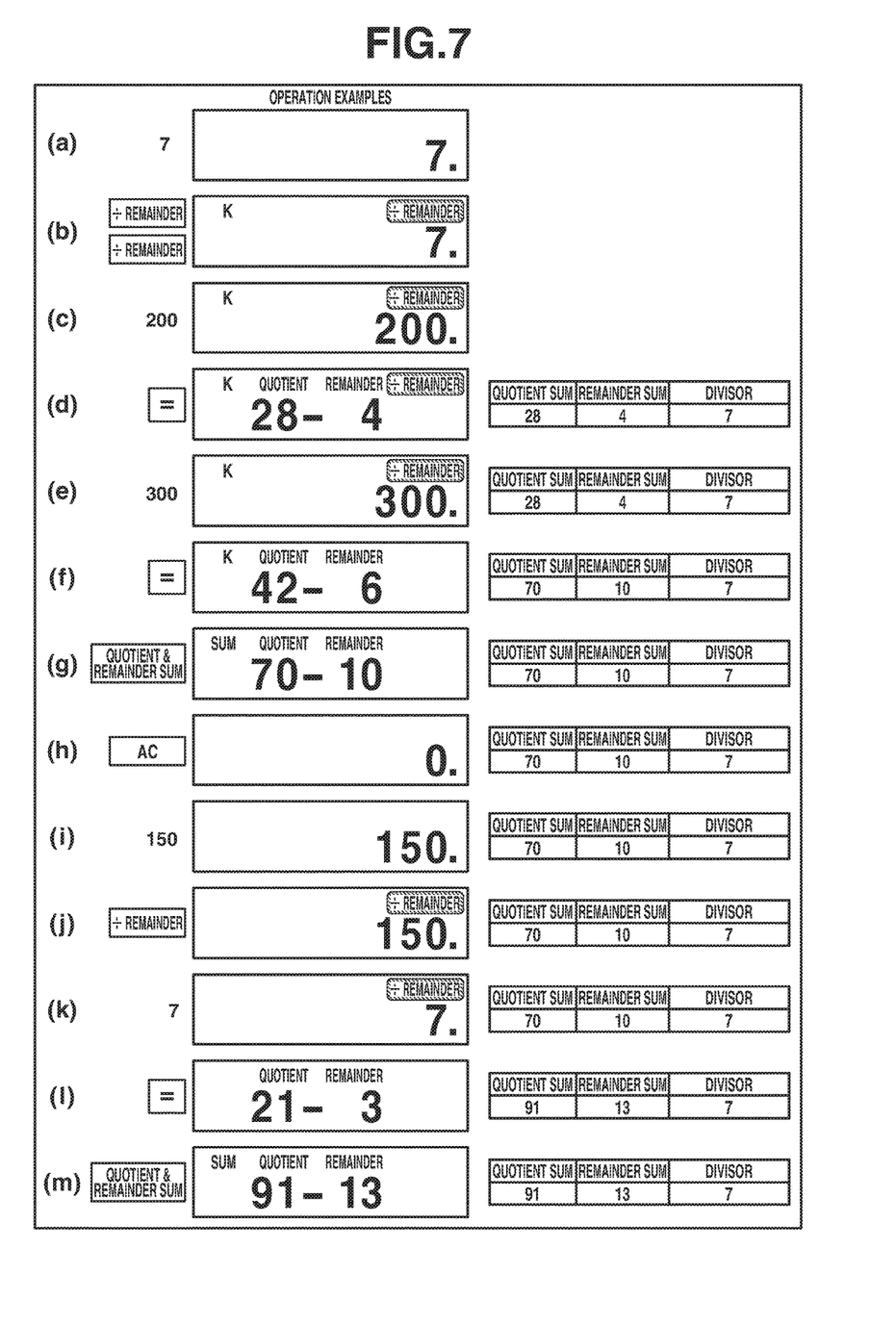
FIG. 7 is a view for explaining examples (a)-(m) of operation performed by the calculation apparatus according to the second embodiment of the invention.

FIG. 7 is a view for explaining operation examples (a)-(m) performed by the calculation apparatus 1 according to the second embodiment of the invention.

FIG. 7 (a)-(m) show an image transition indicated on the displaying unit 14 and a transition of numerals stored in the quotient & remainder sum memory area, indicated on the display screen of the displaying unit 14 in response to operation of the key input unit 12. The operated keys are indicated on the left side of the display screen and data stored in the quotient & remainder sum memory area is indicated on the right side of the display screen.

Since the controlling procedure and indicated images shown in FIG. 7 (a)-(f) are substantially the same as those indicated in FIG. 4 (a)-(f), the description thereof will be omitted and only FIG. 7 (g)-(m) will be described.

When the quotient & remainder sum key is pressed with the operation result "42-6" indicated on the displaying unit 14 as shown at (f) in FIG. 7, the CPU 11 judges whether the "quotient & remainder sum" key has been pressed (step S105 in FIG. 6). Since the "quotient & remainder sum" key was pressed previously, the CPU 11 determines YES at step S105, and advances to step S122, where the CPU 11 displays the quotient sum with remainder "70-10" on the displaying unit 14 and indicates the operation result explaining character strings: "quotient" and "remainder" at corresponding positions on the top side of the operation result "70-10", as shown at (g) in FIG. 7.

More specifically, since step S120 and S121 of the flow chart of FIG. 3 are omitted from the flow chart of FIG. 6, no carrying-up process is executed in the second embodiment. In other words, the second embodiment is different from the first embodiment in that only the quotient sum and the remainder sum are indicated without executing the carrying-up process.

In the procedures (h) to (l) in FIG. 7, the carrying-up process is not executed on the data stored in the quotient & remainder sum memory shown at (g) in FIG. 7. Since no carrying-up process is executed, although the data stored in the quotient & remainder sum memory shown at (g) in FIG. 7 is different from the data stored in the quotient & remainder sum memory shown at (g) in FIG. 4, the procedures (h) to (l) in FIG. 7 are the same as the procedures (h) to (l) in FIG. 4.

When the quotient & remainder sum key is pressed with the operation result "21-3" indicated on the displaying unit 14 as shown at (l) in FIG. 7, the CPU 11 judges whether the "quotient & remainder sum" key has been pressed (step S105). Since the "quotient & remainder sum" key was pressed previously, the CPU 11 determines YES at step S105, and advances to step S122, where the CPU 11 executes no carrying-up process and displays the quotient sum with remainder "91-13" on the displaying unit 14, indicating the operation result explaining character strings: "quotient" and "remainder" at corresponding positions on the top side of the quotient sum with remainder "91-13", as shown at (m) in FIG. 7.

In the controlling procedure of the second embodiment, even if the remainder sum is larger than the operand (divisor), it is possible to indicate the quotient sum and the remainder sum without executing the carrying-up process.

In the second embodiment, in a calculation directly after the "AC" key has been pressed, as far as the "÷ remainder" calculation is executed using the same operand (divisor) as one used in the previous calculation, the calculation result is added to the quotient sum and the remainder sum registered in the quotient & remainder sum memory, and when another operand (divisor) is entered, the quotient & remainder sum memory is cleared. But it is possible to clear the quotient & remainder sum memory in response to operation of the "AC" key.

Although the calculation apparatus 1 of the present invention has been explained with reference to the embodiments described in the foregoing detailed description, it will be understood that the invention is not limited to the particular embodiments described herein. For instance, it may be possible to configure the calculation apparatus 1 such that the apparatus 1 allows the user to select an operation mode and when a first mode is selected, the operation described in the first embodiment is performed and when a second mode is selected, the operation described in the second embodiment is performed. Modifications and rearrangements may be made to the disclosed embodiments while remaining within the scope of the invention as defined by the following claims. It is intended to include all such modifications and rearrangements in the following claims and their equivalents.

What is claimed is:

1. A calculation apparatus having a controlling unit, wherein the controlling unit, under instructions stored in a storing unit, performs processes comprising:
    a first storing process for storing a first input value in the storing unit;
    a first displaying process for executing an operation on a second input value, using the first input value to obtain a first output value and a second output value, and for displaying the first output value and the second output value on a displaying unit;
    a second displaying process for executing the operation on a third input value, using the first input value to obtain a third output value and a fourth output value, and for displaying the third output value and the fourth output value on the displaying unit;
    a second storing process for adding the third output value displayed on the displaying unit to the first output value to obtain a first sum, and adding the fourth output value displayed on the displaying unit to the second output value to obtain a second sum, and for storing the first sum and the second sum in the storing unit; and
    a sum displaying process for reading and displaying at least one of the first sum and the second sum on the displaying unit in response to operation of a first key of a key input unit.

2. The calculation apparatus according to claim 1, wherein
    the controlling unit further performs a third storing process for storing a fourth input value in the storing unit;
    when a second key of the input key unit is operated only once after the fourth input value is entered, the controlling unit performs a third displaying process for executing the operation on the fourth input value stored in the storing unit, using the fifth input value to obtain a fifth output value and a sixth output value and for displaying the fifth output value and the sixth output value on the displaying unit; and
    when the second key of the input key unit is continuously operated twice after the first input value is entered, the controlling unit performs the first displaying process and the second displaying process upon receipt of the second input value and the third input value.

3. The calculation apparatus according to claim 2, wherein
    the controlling unit performs the third displaying process after performing the first displaying process and the second displaying process; and
    when the fifth input value is equivalent to the first input value, the controlling unit performs a fourth storing process for adding the fifth output value to the first sum to obtain a third sum and adding the sixth output value to the second sum to obtain a fourth sum and for storing the third sum and the fourth sum in the storing unit; and
    when the fifth input value is not equivalent to the first input value, the controlling unit further performs a fifth storing process for eliminating the first sum and the second sum from the storing unit and for storing the fifth output value and the sixth output value in the storing unit.

4. The calculation apparatus according to claim 1, wherein
    the controlling unit divides the input values entered to be used as dividends by the input values entered to be used as divisors to obtain quotients as the first output value, the third output value and the fifth output value, and divides the input values entered to be used as dividends by the input values entered to be used as divisors to obtain remainders as the second output value, the fourth output value and the sixth output value.

5. The calculation apparatus according to claim 1, wherein
    when the second sum is not smaller than the first input value entered to be used as a divisor, the controlling unit performs a carrying-up process such that the second sum will be smaller than the first input value to be used as a divisor, thereby obtaining the first sum and the second sum, both having been subjected to the carrying-up process; and
    the controlling unit displays one of the first sum and the second sum, both having been subjected to the carrying-up process, on the displaying unit in the sum displaying process.

6. A displaying method performed by a computer provided in a calculation apparatus, wherein the calculation apparatus has a storing unit, a key input unit, and a displaying unit, the method comprising:

a first storing process for storing a first input value in the storing unit;

a first displaying process for executing an operation on a second input value, using the first input value stored in the storing unit to obtain a first output value and a second output value, and for displaying the first output value and the second output value on the displaying unit;

a second displaying process for executing the operation on a third input value, using the first input value stored in the storing unit to obtain a third output value and a fourth output value, and for displaying the third output value and the fourth output value on the displaying unit;

a second storing process for adding the third output value displayed on the displaying unit to the first output value to obtain a first sum, and adding the fourth output value displayed on the displaying unit to the second output value to obtain a second sum, and for storing the first sum and the second sum in the storing unit; and a sum displaying process for reading and displaying at least one of the first sum and the second sum stored in the storing unit on the displaying unit in response to operation of a first key of the key input unit.

7. The displaying method performed by a computer in a calculation apparatus, according to claim 6, further comprising:

a third storing process for storing a fourth input value in the storing unit; and a third displaying process to be performed, when a second key of the input key unit is operated only once after the fourth input value is entered, for executing the operation on the fourth input value stored in the storing unit, using the fifth input value to obtain a fifth output value and a sixth output value and for displaying the fifth output value and the sixth output value on the displaying unit, wherein when the second key of the input key unit is continuously operated twice after the first input value is entered, the first displaying process and the second displaying process are performed upon receipt of the second input value and the third input value.

8. The displaying method performed by a computer in a calculation apparatus, according to claim 7, wherein the third displaying process is performed after the first displaying process and the second displaying process are performed, the method further comprising:

a fourth storing process to be performed, when the fifth input value is equivalent to the first input value, to add the fifth output value to the first sum to obtain a third sum and add the sixth output value to the second sum to obtain a fourth sum, and to store the third sum and the fourth sum on the storing unit; and a fifth storing process to be performed, when the fifth input value is not equivalent to the first input value, to eliminate the first sum and the second sum from the storing unit and to store the fifth output value and the sixth output value in the storing unit.

9. The displaying method performed by a computer in a calculation apparatus, according to claim 6, wherein the input values entered to be used as dividends are divided by the input values entered to be used as divisors to obtain quotients as the first output value, the third output value and the fifth output value, and the input values entered to be used as dividends are divided by the input values entered to be used as divisors to obtain remainders as the second output value, the fourth output value and the sixth output value.

10. The displaying method performed by a computer in a calculation apparatus, according to claim 6, further comprising:

a carrying-up process to be performed when the second sum is not smaller than the first input value entered to be used as a divisor, to make the second sum smaller than the first input value as a divisor, whereby the first sum and the second sum, both having been subjected to the carrying-up process are obtained, wherein at least one of the first sum and the second sum, both having been subjected to the carrying-up process is displayed on the displaying unit in the sum displaying process.

11. A non-transitory recording medium with a program executable by a controlling unit, stored thereon, wherein the controlling unit is mounted on a calculation apparatus having a storing unit, a key input unit, and a displaying unit, and the program instructs the controlling unit to perform processes comprising:

a first storing process for storing a first input value in the storing unit;

a first displaying process for executing an operation on a second input value, using the first input value stored in the storing unit to obtain a first output value and a second output value, and for displaying the first output value and the second output value on the displaying unit;

a second displaying process for executing the operation on a third input value, using the first input value stored in the storing unit to obtain a third output value and a fourth output value, and for displaying the third output value and the fourth output value on the displaying unit;

a second storing process for adding the third output value displayed on the displaying unit to the first output value to obtain a first sum, and adding the fourth output value displayed on the displaying unit to the second output value to obtain a second sum, and for storing the first sum and the second sum in the storing unit; and a sum displaying process for reading and displaying at least one of the first sum and the second sum stored in the storing unit on the displaying unit in response to operation of a first key of the key input unit.

12. The non-transitory recording medium with a program executable by a controlling unit, stored thereon, according to claim 11, wherein the program further instructs the controlling unit to perform the following processes:

a third storing process for storing a fourth input value in the storing unit;

a third displaying process to be executed, when a second key of the input key unit is operated only once after the fourth input value is entered, for executing the operation on the fourth input value stored in the storing unit, using the fifth input value to obtain a fifth output value and a sixth output value and for display the fifth output value and the sixth output value on the displaying unit; and when the second key of the input key unit is continuously operated twice after the first input value is entered, the first displaying process and the second displaying process are performed upon receipt of the second input value and the third input value.

13. The non-transitory recording medium with a program executable by a controlling unit, stored thereon, according to claim 12, wherein the program instructs the controlling unit to perform the third displaying process after performing the first displaying process and the second displaying process, and the program further instructs the controlling unit to perform a fourth storing process to be executed, when the fifth input value is equivalent to the first input value, for adding the fifth output value to the first sum to obtain a third sum and adding the sixth output value to the second sum to obtain a fourth sum and for storing the third sum and the fourth sum in the storing unit; and to perform a fifth storing process to be executed, when the fifth input value is not equivalent to the first input value, for eliminating the first sum and the second sum from the storing unit and storing the fifth output value and the sixth output value in the storing unit.

14. The non-transitory recording medium with a program executable by a controlling unit, stored thereon, according to claim 11, wherein the input values entered to be used as dividends are divided by the input values entered to be used as divisors to obtain quotients as the first output value, the third output value and the fifth output value, and the input values entered to be used as dividends are divided by the input values entered to be used as divisors to obtain remainders as the second output value, the fourth output value and the sixth output value.

15. The non-transitory recording medium with a program executable by a controlling unit, stored thereon, according to claim 11, wherein when the second sum is not smaller than the first input value to be used as a divisor, the program further instructs the controlling unit to perform a carrying-up process such that the second sum will be smaller than the first input value as a divisor, thereby obtaining the first sum and the second sum, both having been subjected to the carrying-up process; and at least one of the first sum and the second sum, both having been subjected to the carrying-up process is displayed on the displaying unit in the sum displaying process.

* * * * *